US009515793B2

(12) United States Patent
Kumar et al.

(10) Patent No.: US 9,515,793 B2
(45) Date of Patent: Dec. 6, 2016

(54) NETWORK RESOURCE CONFIGURATION

(71) Applicant: Telefonaktiebolaget L M Ericsson (PUBL), Stockholm (SE)

(72) Inventors: N Hari Kumar, Chennai (IN); Ranjani Balakrishnan, Chennai (IN); Darshana Krishnadas, Thiruvananthapuram (IN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 292 days.

(21) Appl. No.: 13/806,120

(22) PCT Filed: Nov. 29, 2012

(86) PCT No.: PCT/EP2012/073961
§ 371 (c)(1),
(2) Date: Dec. 20, 2012

(87) PCT Pub. No.: WO2014/082672
PCT Pub. Date: Jun. 5, 2014

(65) Prior Publication Data
US 2014/0177544 A1  Jun. 26, 2014

(51) Int. Cl.
*H04L 5/00* (2006.01)
*H04L 12/911* (2013.01)
*H04L 12/927* (2013.01)
*H04L 12/923* (2013.01)

(52) U.S. Cl.
CPC ........... *H04L 5/0037* (2013.01); *H04L 47/805* (2013.01); *H04L 47/828* (2013.01); *H04L 47/762* (2013.01); *H04L 47/781* (2013.01); *H04L 47/822* (2013.01); *H04L 47/824* (2013.01)

(58) Field of Classification Search
CPC ...... H04L 5/0037; G06N 5/02; G06Q 30/02; G06Q 30/0201; G06Q 30/0202

USPC .................................................. 370/328, 329
See application file for complete search history.

(56) References Cited

U.S. PATENT DOCUMENTS

| 8,712,828 B2* | 4/2014 | Maga et al. ................. 705/7.31 |
| 2003/0200135 A1* | 10/2003 | Wright ............................ 705/10 |
| 2004/0215656 A1* | 10/2004 | Dill et al. ................. 707/103 R |
| 2007/0156673 A1 | 7/2007 | Maga et al. |
| 2010/0332270 A1* | 12/2010 | Richter et al. .................... 705/7 |

(Continued)

OTHER PUBLICATIONS

Boothe, T. et al. "Service quality-managing the user experience," XP055023907, Dec. 21, 2011, pp. 1-40.
Lin, H. et al. "Utility based service differentiation in COMA data networks," Wireless Networks, The Journal of Mobile Communications, Computation and Information, XP019410566, vol. 12, No. 5, May 8, 2006, pp. 623-636.

(Continued)

*Primary Examiner* — Jamal Javaid
(74) *Attorney, Agent, or Firm* — Patent Portfolio Builders, PLLC

(57) ABSTRACT

Network resource configuration is provided by receiving subscriber data, the subscriber data relating to network related activities and subscriber related activities of subscribers in a group of subscribers of a network operator of a communications system. A churn score is determined for each subscriber in the group of subscribers based on a set of churn score parameters for the subscriber data, the churn score representing probability of a subscriber to churn. A subgroup of subscribers is determined from the group of subscribers based on the churn score. A network resource configuration in the communications system is determined for the subgroup of subscribers based on the churn score. Information relating to the determined network resource configuration and/or a service related to the determined network resource configuration is transmitted.

24 Claims, 5 Drawing Sheets

(56) References Cited

U.S. PATENT DOCUMENTS

2011/0106579 A1* 5/2011 Nair et al. .................. 705/7.28
2011/0295649 A1* 12/2011 Fine et al. .................. 705/7.29
2012/0014326 A1* 1/2012 Dwyer et al. ............... 370/328
2013/0054306 A1* 2/2013 Bhalla et al. ............... 705/7.31

OTHER PUBLICATIONS

Pal, S. et al. "A two-level resource management scheme in wireless networks based on user-satisfaction," Mobile Computing and Communications Review, vol. 9, No. 4, XP040029919, Oct. 1, 2005, pp. 4-14.

* cited by examiner

NETWORK RESOURCE CONFIGURATION

CROSS REFERENCE TO RELATED APPLICATION(S)

This application is a 35 U.S.C. §371 National Phase Entry Application from PCT/EP2012/073961, filed Nov. 29, 2012, designating the United States, the disclosure of which is incorporated herein in its entirety by reference.

TECHNICAL FIELD

Embodiments presented herein relate to network resource configuration, and particularly to network resource configuration based on a churn score.

BACKGROUND

In mobile communication networks, there is always a challenge to obtain good performance and capacity for a given communications protocol, its parameters and the physical environment in which the mobile communication network is deployed. One parameter related to performance and capacity of a wireless device in a mobile communication network is the network resource configuration associated with the wireless device.

One particular parameter that may influence network resource configuration is customer churn or subscriber churn. It is known that acquiring new subscribers requires more resources than retaining existing subscribers. Hence there exists a value in preventing potential churners on time. Subscribers become churners when they discontinue one operator's subscription and move to another operator.

There exist a large number of churn models in the market which try to predict churners based on the history of their behavior. In the published patent application US2011/0206579 A1 entitled "System and Method of Management and Reduction of Subscriber Churn in Telecommunications Networks", customer churn is predicted based on the user's usage behavior by considering usage history for 2 to 4 months. However, on a day-to-day scenario, subscribers' behavior changes dramatically owing for example to external parameters such as campaigns, competitor advertisement, etc. Thus, predicting churn based on history challenges its accuracy and even more, may not prevent churn on time. Data explosion in telecom usage makes the churn analysis still more difficult, as most of the churn detection models need a large amount of historical data to be maintained, which imposes heavy resource requirements for calculation and storage. Also, the significant number of false positives in churn prediction could lead to the operator launching retention campaigns to a number of non-churners, which in turn would result in revenue and resource loss.

As noted above, subscriber churn may be related to network resource configuration. Hence, there is a need for an improved network resource configuration.

SUMMARY

An object of embodiments herein is to provide improved network resource configuration.

The inventors of the enclosed embodiments have through a combination of practical experimentation and theoretical derivation discovered that it would be beneficial if churners could be predicted on time, and without wastage of network resources.

Therefore, it is desirable to find a churn model which can predict churners on time on a day-to-day basis with less dependency on historic data and which stores minimal information about subscribers. The inventors of the enclosed embodiments have further realized that it may therefore be needed to analyzing behavioral characteristics of a subscriber based on a model which considers network related activities and subscriber related activities for the subscriber. These activities may be related to refill behavior of the subscriber, the mobile social network of the subscriber, and the probability to churn may be predicted on daily basis. An operator may thereby predict whether the subscriber is likely to churn or not.

A particular object is therefore to provide improved network resource configuration based on network related activities and subscriber related activities for the subscriber.

According to a first aspect there is presented a method for network resource configuration. The method comprises receiving subscriber data. The subscriber data relates to network related activities and subscriber related activities of subscribers in a group of subscribers of a network operator of a communications system. The method comprises determining a churn score for each subscriber in the group of subscribers based on a set of churn score parameters for the subscriber data, the churn score representing probability of a subscriber to churn. The method comprises determining a subgroup of subscribers from the group of subscribers based on the churn score. The method comprises determining a network resource configuration in the communications system for the subgroup of subscribers based on the churn score. The method comprises transmitting information relating to the determined network resource configuration and/or a service related to the determined network resource configuration.

Advantageously this allows an accurate determination to be achieved without the need to store large amounts of historical data since the method needs access to only particular network related activities and subscriber related activities.

Advantageously the enclosed embodiments are applicable for different kinds of operators. Further, for actions that are performed by all prepaid subscribers irrespective of operator, the enclosed embodiments are particularly suitable for subscriber data in telecommunications systems.

According to a second aspect there is presented a network operator node for network resource configuration. The network operator node comprises a receiver arranged to receive subscriber data, the subscriber data relating to network related activities and subscriber related activities of subscribers in a group of subscribers of a network operator of a communications system. The network operator node comprises a processing unit arranged to determine a churn score for each subscriber in the group of subscribers based on a set of churn score parameters for the subscriber data, the churn score representing probability of a subscriber to churn. The processing unit is further being arranged to determine a subgroup of subscribers from the group of subscribers based on the churn score. The processing unit is further being arranged to determine a network resource configuration in the communications system for the subgroup of subscribers based on the churn score. The network operator node comprises a transmitter arranged to transmit information relating to the determined network resource configuration and/or a service related to the determined network resource configuration.

According to a third aspect there is presented a computer program for network resource configuration, the computer program comprising computer program code which, when run on a network operator node, causes the network operator node to perform a method according to the first aspect.

to According to a fourth aspect there is presented a computer program product comprising a computer program according to the third aspect and a computer readable means on which the computer program is stored. According to an embodiment the computer readable means are non-volatile computer readable means.

It is to be noted that any feature of the first, second, third and fourth aspects may be applied to any other aspect, wherever appropriate. Likewise, any advantage of the first aspect may equally apply to the second, third, and/or fourth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

The massive growth in telecom data produced every day makes the prediction of network related activities of a subscriber, such as churn, difficult. Adding to this challenge is the fact that churn prediction of probable churners advantageously needs to be performed at near real time because if efforts are not taken immediately to retain the subscribers, the subscribers would disappear from the operator's network. Predicting churn on time and with quality serves several purposes, some of which are listed below:

Stop movement of subscribers from one operator to another due to ripple effect of churn Enabling effective retention prioritization by enabling the right set of subscribers to be targeted based on their churn risk Reduce the revenue loss due to churn of subscribers Identifying and taking timely action towards subscribers at risk of churn will have a positive impact on any network configurations which may need to be performed by the network operator of the subscribers. Preferably, potential churners should be detected on a daily basis with high accuracy using limited computational resources.

The embodiments disclosed herein relate to network resource configuration. In order to obtain network resource configuration there is provided a network operator node, a method performed in the network operator node, a computer program comprising code, for example in the form of a computer program product, that when run on a network operator node, causes the network operator node to perform the method.

Figure 1:
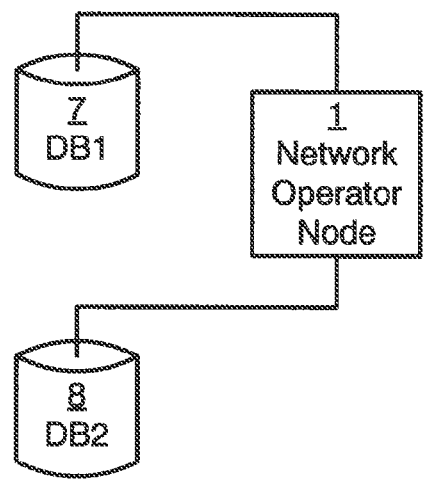
FIG. 1 is a schematic diagram illustrating a network operator node operatively connected to databases.

FIG. 1 is a schematic diagram illustrating a network operator node 1. The network operator node 1 is operatively connected to a first database (DB1) 7 and a second database (DB2) 8. The first database 7 stores network related activities of subscribes in a network of the network operator of the network operator node 1. The second database 8 stores subscriber related activities of subscribes in a network of the network operator of the network operator node 1. As will be further disclosed below the network operator node 1 is arranged to determine a churn score based on the parameters stored in the first database 7 and in the second database 8. The network operator of the network operator node 1 may thereby determine to which subscribers a network resource configuration is to be determined. The network resource configuration may relate to a network resource being allocated to the subscribers and/or a network subscription service provided by the network operator of the network operator node 1. According to one embodiment the first database 7 and the second database 8 are one and the same database.

Figure 2:
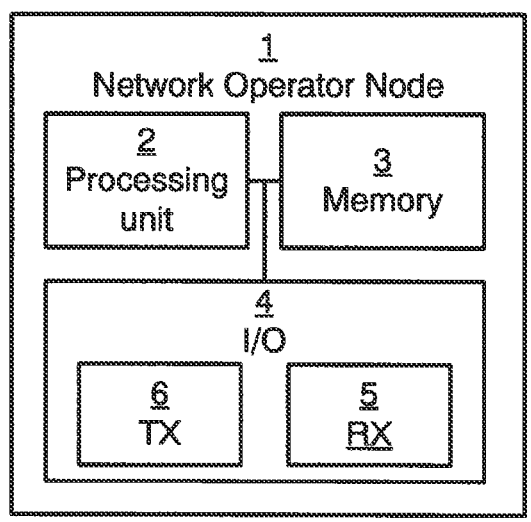
FIG. 2 is a schematic diagram showing functional modules of a network operator node.

FIG. 2 schematically illustrates, in terms of a number of functional modules, the components of a network operator node 1. A processing unit 2 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 18 (as in FIG. 3), e.g. in the form of a memory 3. Thus the processing unit 2 is thereby arranged to execute methods as herein disclosed. The memory 3 may also comprise persistent storage, which, for example, can be any single one or combination of magnetic memory, optical memory, solid state memory or even remotely mounted memory. The network operator node 1 may further comprise an input/output (I/O) interface 4 for receiving and providing information from/to other devices and entities in a network operatively connected to the network node 1 and from/to the first database 7 and the second database 8. The I/O interface 4 therefore comprises one or more transmitters (TX) 6 and receivers (RX) 5, comprising analogue and digital components and a suitable number of network interfaces and/or antennae for communication with the devices and entities in a network operatively connected to the network node 1. The processing unit 2 controls the general operation of the network node 1, e.g. by sending control signals to the transmitter 6 and/or receiver 5 and receiving reports from the transmitter 6 and/or receiver 5 of its operation. Other components, as well as the related functionality, of the network node 1 are omitted in order not to obscure the concepts presented herein.

Figure 3:
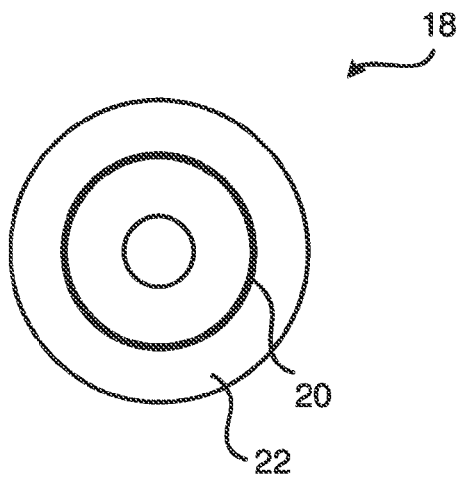
FIG. 3 shows one example of a computer program product comprising computer readable means.
Figure 5:
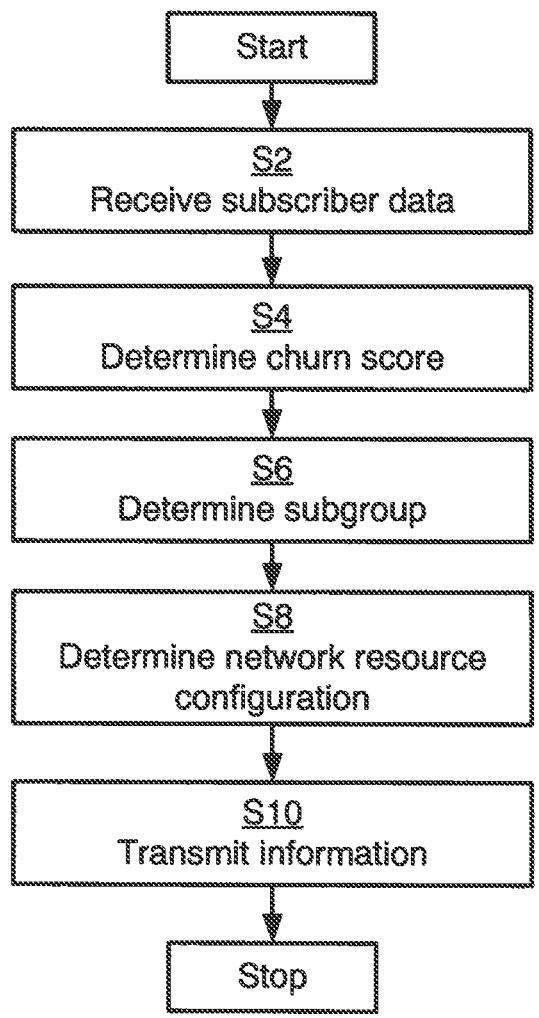
FIGS. 5-8 are flowcharts of methods according to embodiments.
Figure 6:
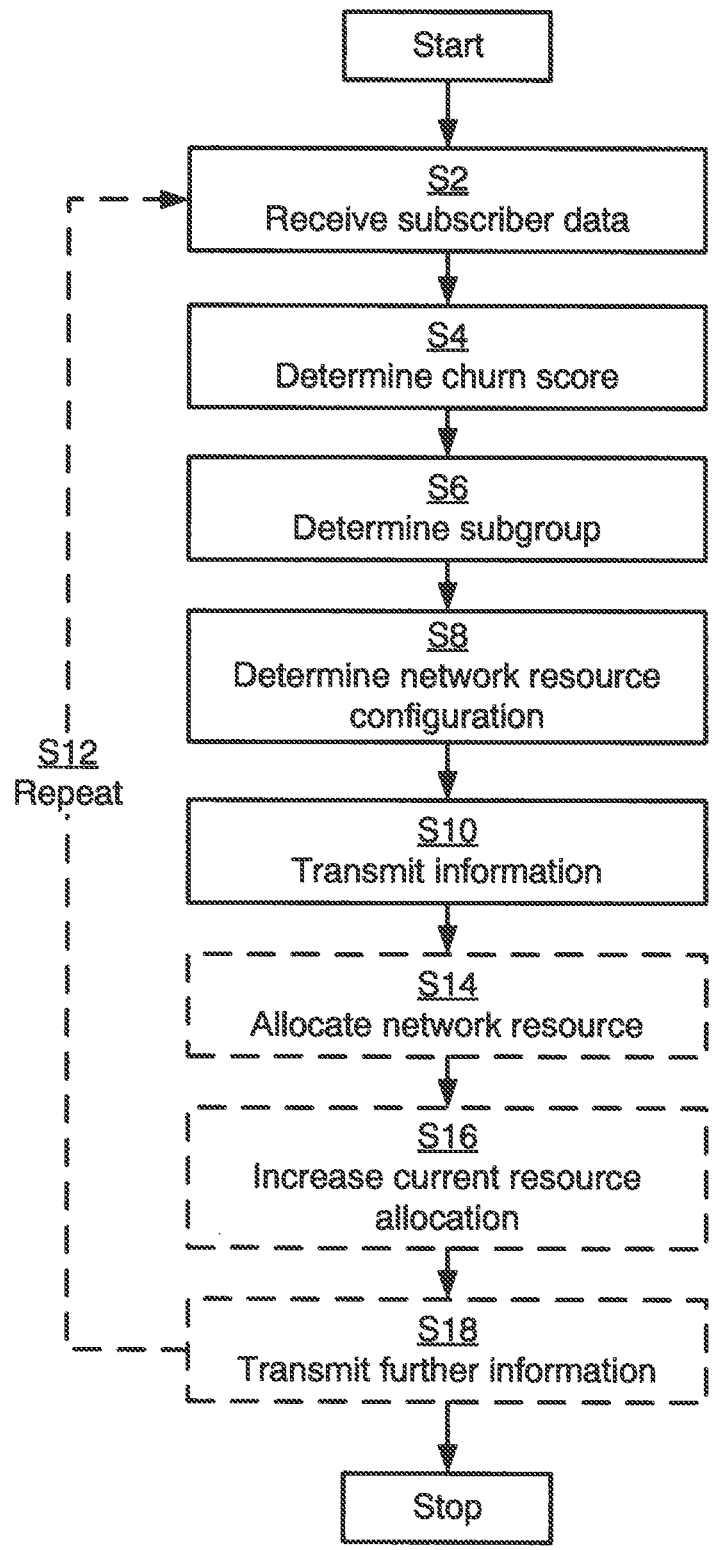

FIGS. 5 and 6 are flow charts illustrating embodiments of methods for network resource configuration. The methods are performed in the network node 1. The methods are advantageously provided as computer programs 20. FIG. 3 shows one example of a computer program product 18 comprising computer readable means 22. On this computer readable means 22, a computer program 20 can be stored, which computer program 20 can cause the processing unit 2 and thereto operatively coupled entities and devices, such as the memory 3, the I/O interface 4, the transmitter 6 and the receiver 5 to execute methods according to embodiments described herein. In the example of FIG. 3, the computer program product 18 is illustrated as an optical disc, such as a CD (compact disc) or a DVD (digital versatile disc) or a Blu-Ray disc. The computer program product 18 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory. Thus, while the computer program 20 is here schematically shown as a track on the depicted optical disk, the computer program 20 can be stored in any way which is suitable for the computer program product 18.

Churn Score

A churn score may be defined as a normalized measure which indicates probability of a subscriber to churn. The higher the churn score, the higher is the probability of the subscriber to churn from the network of its current operator. Subscribers with high churn scores should be prioritized and measures may be taken to retain the subscribers within their current network.

Factors considered for determining the churn score for a subscriber relates to subscriber data. The subscriber data relates to network related activities and subscriber related activities of subscribers in a group of subscribers of a network operator of a communications system. Hence, a method for network resource configuration comprises in a step S2 receiving subscriber data, where the subscriber data relates to network related activities and subscriber related activities of subscribers in a group of subscribers of a network operator of a communications system. According to one embodiment the subscriber data is received by the receiver 5 of the network operator node 1. The receiver 5 is thus arranged to receive such subscriber data.

Network related activities and subscriber related activities may relate to a number of parameters. Examples of such parameters will be described next. According to embodiments at least one of the churn score parameters of one subscriber relates to subscription refill statistics of the one subscriber.

Last Subscription Refill

This parameter relates to the number of days passed since the last refill was performed by the subscriber. This measure gives a primary indication of the subscriber behavior. This measure can be directly determined from data comprising the last refill date stored per subscriber. Thus, according to an embodiment, the subscription refill statistics of the one subscriber relates to a time since the last subscription refill for the one subscriber. Further, according to an embodiment the churn score is proportional to the time since the last subscription refill for the one subscriber.

Mean Time Between Subscription Refills (MTBSR)

This parameter relates to the average number of days between two successive refills of a subscriber. Here, the running average may be determined as this will reflect the refill behavior for, say, the past 'n' months. That is, the MTBSR may only includes subscription refills during the last 'n' months, where $n' \leq 12$, preferably $n' \leq 6$, and most preferably $n' \leq 3$. The value of 'n' can be determined by balancing the amount of data to be stored and the accuracy needed. The value of 'n' can be also determined based on a feedback loop. If a subscriber has not refilled for a period more than the mean time between subscriber refills the subscriber should have a high probability to churn. Thus, according to an embodiment, the subscription refill statistics of the one subscriber relates to a mean time between subscription refills, MTBSR, for the one subscriber. Further, according to an embodiment the churn score is proportional to the MTBSR.

Figure 7:
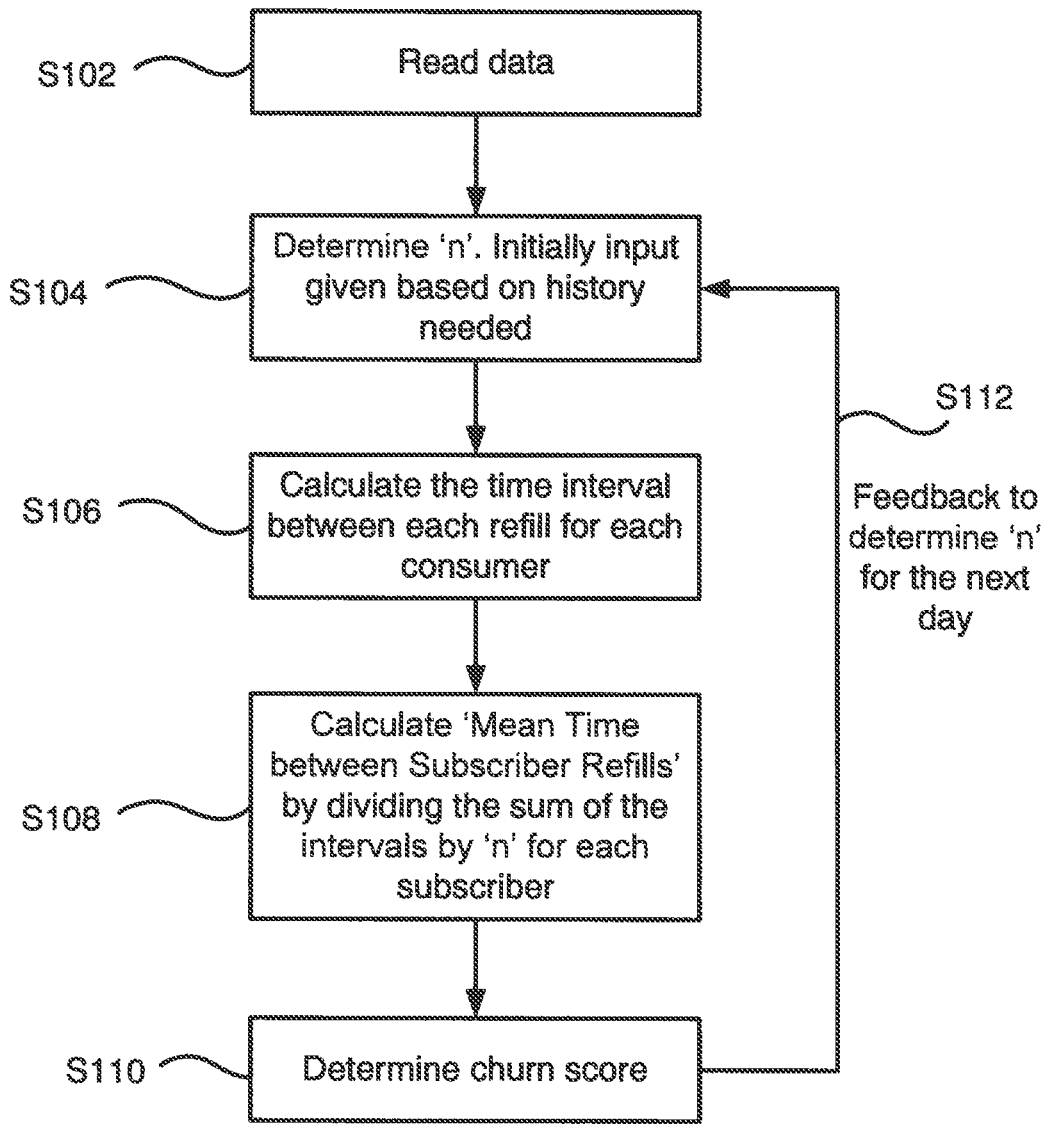

MTBSR may be calculated according to the flowchart of FIG. 7. In a step S102 data is read by the processing unit 2. In a step S104 'n' is determined by the processing unit 2. In a step S106 the time interval between each refill for each subscriber is calculated by the processing unit 2. In a step S108 the MTBSR is determined as the sum of the time intervals divided by 'n' for each subscriber by the processing unit 2. In a step S110 the churn score is determined by the processing unit 2. How the churn score is determined is disclosed below. The result of the churn score determination may be used by the processing unit 2 as feedback, step S112, in order for the processing unit 2 to determine in the next execution of step S104.

Age on Network

This parameter relates to the value of how long a subscriber has been associated with an operator. This parameter may be used to create a bias towards loyal subscribers, i.e. subscribers with a low probability to churn. According to real time scenarios, loyal subscribers have shown less affinity towards churn. For example, Let subscriber 'A' denote a subscriber having been associated with the operator for 10 years, and subscriber 'B' denote a subscriber having been associated with the operator for 5 months. Assume further that subscriber 'A' and subscriber 'B' have the same number of days since last refill score and the same MTBSR score. However, by considering also how long a subscriber has been associated with the operator subscriber 'A' and subscriber 'B' may not be given the same churn score; subscriber 'A' may be regarded more loyal to the operator and hence be associated with a lower churn score than subscriber 'B'. In general terms, the parameter associated with the age on the network may be defined as the time since subscriber activation. Network operators may configure the subscriber activation to define the first refill of the subscriber. The present parameter may be used to create a corresponding bias in the model. Thus, according to an embodiment, the subscription refill statistics of the one subscriber relates to a time since the first subscription refill for the one subscriber. Further, according to an embodiment the churn score is inversely proportional to a logarithm of the time since the first subscription refill for the one subscriber.

Degree-Ratio

This parameter relates to a ratio indicating the subscribers affinity towards the operator's network. This parameter may be determined as the ratio of the number of connections within the network to the total number of connections of the subscriber. This parameter may be used to create a bias towards subscribers who are more closely associated with the network operator. According to real time scenarios, subscribers who are closely associated with the operator show less affinity towards so-called ripple effects. For example, assume that subscriber 'A' has 10 connections within the network of the operator among a total of 12 connections, whilst subscriber 'B' has 5 connections within the network of the operator among a total of 10 connections. By considering the ratio of the number of connections within the network to the total number of connections of the subscriber 'A' would be associated with a lower churn score than subscriber 'B'. Thus, according to an embodiment, at least one of the churn score parameters of one subscriber relates to the number of contacts associated with the one subscriber that are associated with the same network operator as the one subscriber.

Account Balance-Ratio

This parameter relates to the trend of the subscribers account balance at the time of refill over a period of time. In the life on the network of every subscriber, it has been observed that patterns of refill exist based on the remaining account balance at the time of each refill. The account balance-ratio may be determined as the ratio of the current account balance to the mode of the remaining account balance at the time of refill (such as the value of the account balance just before the churn score becomes 0) over a period of time. Hence if the subscriber's account balance is less than the mode of account balance when the subscriber performs a refill, the churn score may increase. At any instant where the subscriber's account balance is higher than the mode value, the probability to churn should be regarded as low. Applying such a parameter may avoid characterizing subscribers as churners which would otherwise obtain a churn score higher than 50% (for example higher than 50 points on a 0-100 point scale, see below), thus reducing the number of false-positives and thus saving unnecessary network resources.

The parameter may thus not only relate to the current account balance. Also the trend of account balance at the time of previous refills may be taken into consideration. Examples of network resources are provided below. Thus, according to an embodiment, at least one of the churn score parameters of the one subscriber relates to a current account balance of the one subscriber at a time of subscription refill. Further, according to an embodiment the churn score is proportional to the current account balance.

New Service Plan Factor

While studying the refill pattern of subscribers to predict churn, it may also be analyzed whether or not such a sudden change in refill pattern indicating a probability for subscriber churn is due to some specific factor or not. One factor which could cause a change in refill behavior of a subscriber is the start of use of a new product or shift to a new service plan. A subscriber, who normally follows a specific refill pattern after regular intervals, could find a reason which could cause the subscriber to advance or delay the time to refill based on the new service plan/product. Without taking such a new service plan factor into affect a subscriber could otherwise be associated with a high churn score due to such a change, although the subscriber may not necessarily be considered as a high risk churner. If such a use of a new product/service class occurs after the MTBSR of the subscriber, then the delay in refill might not be attributed to this change in behavior. If the subscriber starts using the new product before his MTBSR, this start could be a possible reason for change in refill behavior. The impact on churn score could therefore be such that the closer the start of use is to the MTBSR, the lesser is the impact on the churn score. Thus, according to an embodiment, at least one of the churn score parameters of the one subscriber relates to a current service plan of the one subscriber. The at least one of the churn score parameters may not relate to current service plan as such. Rather, the at least one of the churn score parameters may relate to current service plan in terms of migration of a service plan to another and/or first time use of a specific product, offer, and/or service.

Determination of Churn Score

The above disclosed churn score parameters may be used to determine a churn score. In a step S4 a churn score is determined for each subscriber in the group of subscribers based on a set of churn score parameters for the subscriber data. According to an embodiment the churn score is determined by the processing unit 2 of the network operator node. The processing unit 2 is thus arranged to determine the churn score. The churn score represents probability of a subscriber to churn. Let the function f(x) represent a churn function. According to embodiments f(x) is determined as follows:

$$f(x) = ((1/(\text{degree\_ratio} + \text{account\_balance\_ratio} + \log(\text{AON})))*((x/(2^* \text{MTBSR}))^{\ln(\text{AON})})*(1/\text{NSPF}))*(10^5).$$

Here, x represents the number of days since last subscription refill. Further, e MTBSR>0 represents the mean time between subscription refill, where $1 \leq x \leq 2^*\text{MTBSR}$, and $0 \leq \text{degree-ratio} \leq 1$ represents the ratio between the number of distinct connections within the network and the total number of distinct connections, and AON represents the subscriber's age on the network, and account_balance_ratio represents the ratio of the mode of account balance of the subscriber at the time of the previous refill events (for example the instance before the churn score is reset to 0) to the current account balance of the subscriber. That is, if y is the mode of account balance at the time of refill, then account_balance_ratio=current account balance/y; if current account balance<y, and account_balance_ratio=1 if current account balance≥y. Further, NSPF represents the new service plan factor and may be determined as follows:

$$\text{NSPF} = ((\text{MTBSR} - z)/\text{MTBSR}) + 1, \text{ where } 0 <= z <= \text{MTBSR}$$

$$= 1 \text{ otherwise.}$$

Here, z represents the number of days from last refill to the day new service plan is subscribed. NSPF is equal to 1 when there is no change in the service plan for that subscriber.

A current value for f(x) with 'x' taking the current 'days since last refill' value may thus be determined. Similarly, a minimum value $f(x)_{min}$ with 'x' taking value 1 may be determined as follows:

$$f(x)_{min} = ((1/(\text{degree\_ratio} + \text{account\_balance\_ratio} + \log(\text{AON})))*((1/(2^* \text{MTBSR}))^{\ln(\text{AON})})*(1/\text{NSPF}))*(10^5)$$

Likewise a maximum value $f(x)_{max}$ with 'x' taking the value '2*MTBSR' may be determined as follows:

$$f(x)_{max} = 1/(\text{degree\_ratio} + \text{account\_balance\_ratio} + \log(\text{AON}))*(1/\text{NSPF})$$

The current value for f(x) may then be normalized using min-max normalization with $f(x)_{min}$ as minimum value and $f(X)_{max}$ as maximum value to determine the churn score, i.e.:

$$\text{Churn score} = (f(x) - f(x)_{min})/(f(x)_{max} - f(x)_{min})$$

Characteristics of the Calculated Churn Score

According to the above, the churn score is determined to provide a slow rise until MTBSR and a subsequent steeper rise after MTBSR—influenced by factors such as degree ratio, AON, account balance, and/or NSPF.

The function f(x) is thus defined to be a product of ((1/(degree_ratio+account_balance_ratio+log(AON))) hereinafter referred to as factor 'A', ((x/(2*MTBSR))^ln(AON)) hereinafter referred to as factor 'B' and (1/NSPF)) hereinafter referred to as factor 'C'.

In f(x), factor 'B' contributes such that the day since last refill with respect to twice the mean time between subscriber refills is raised to ln(AON). This factor ln(AON) contributes to such that f(x) increases very slowly until MTBSR and increases steeply from MTBSR to 2MTBSR.

In f(x), factor 'A' brings in the influence of factors like AON, account balance, degree ratio to f(x) such that the churn score is reduced if the value of factor 'A' is high. Log(AON) provides a separation in f(x) such that f(x) for two different subscribers only being different by their AON factor.

In f(x), factor 'C' reduces the churn score if the subscriber has subscribed to a new service plan before reaching MTBSR. The impact of a new subscription is high when the new subscription is executed soon after the refill and gradually reduces as it gets closer to the MTBSR. Beyond MTBSR the new service plan factor does not contribute to f(x).

The factor 10^5 is introduced since the values of f(x) otherwise could be too small for certain calculation system; there would otherwise be a risk that a to value of f(x) would go beyond six decimal places (which is the maximum number of decimals supported by some charging systems).

The functions $f(x)_{min}$ and $f(x)_{max}$ are derived from substitution of the minimum and maximum possible values that 'x' (days since last refill) can take in the expression for f(x). On the day of refill, the churn score is 0. The minimum value of 'x' is 1 (i.e. the next day after the refill) and the maximum value of 'x' is 2*MTBSR (beyond which the churn risk continues to remain at maximum till next refill occurs).

Figure 4:
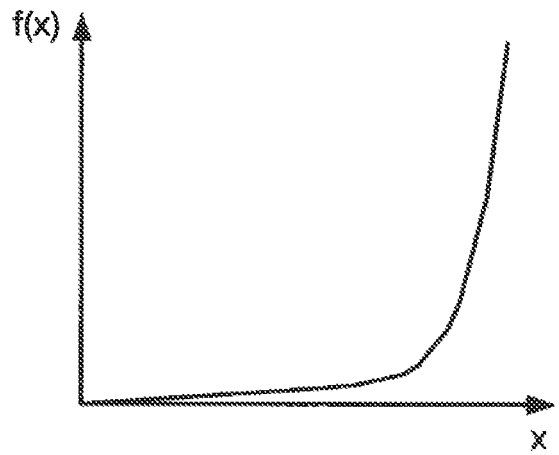
FIG. 4 illustrates a typical behaviour of a churn score function.

In view of the above the churn score will take a value in the interval 0-100. The churn score is preferably reset to 0 on the day on which at least one refill activity is performed by the subscriber. The churn score becomes too when the parameter 'Days since last refill' is equal to two times MTBSR and stays at too until the subscriber performs a next refill. The churn score thus increases with a lower slope until MTBSR and then increases steeply until the churn score value too is reached (at 2*MTBSR days). FIG. 4 schematically illustrates the behaviour of a typical churn score function f(x).

Also in view of the above, the churn score value may be reduced by a number of factors. For example, the higher the factor 'Age on network' is, the lesser the churn score will be, so the churn score is reduced for a higher 'Age on network'. For example, the higher the factor 'Degree-Ratio' is, the lesser the churn score will be, so the churn score is reduced for a higher 'Degree-Ratio'.

For example, the higher the factor 'Account Balance-Ratio' is, the lesser the churn score will be, so the churn score is reduced for a higher 'Account Balance-Ratio'. For example, the higher the factor NSPF is, the lesser the churn score will be, so the churn score is reduced for a higher NSPF value.

Figure 8:
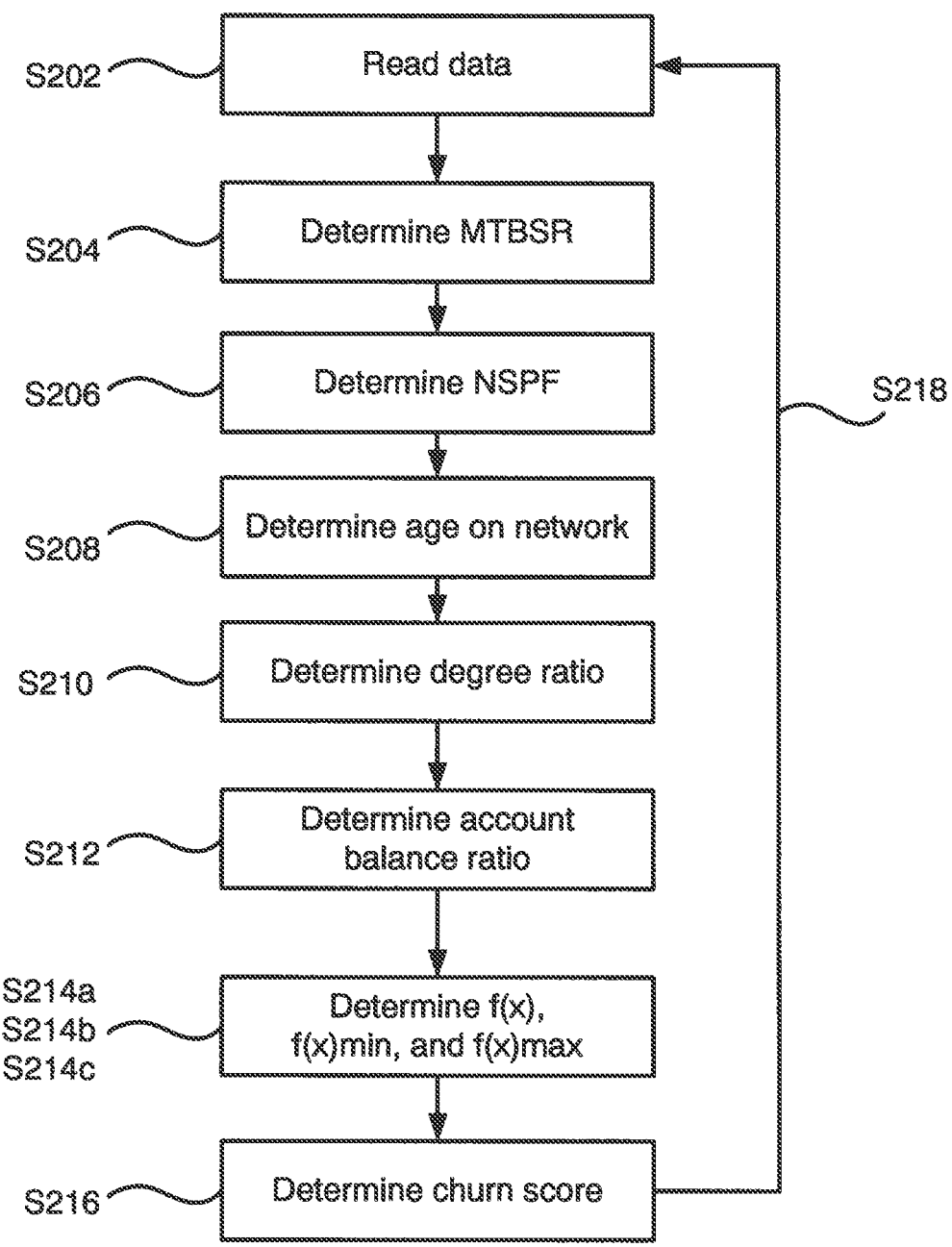

According to one embodiment a method for determining the churn score for a subscriber comprises the following steps, as illustrated in the flowchart of FIG. 8.

In a step S202 data relating to the subscribers of a network operator is read by the processing unit 2. The step S202 may involve reading the 'Days since Last Refill' value, the last 'n' values of refill dates, the activation date, the number of connections in the home network and the total number of connections, the date of change to new service class (if any) after last refill date.

In a step S204 the MTBSR is calculated by the processing unit 2 using the Last 'n' values of refill dates. MTBSR may be calculated according to the flowchart of FIG. 7, see above. This calculation needs only to be performed if a new refill has been performed. Otherwise, an old value of MTBSR may be used.

In a step S206 the new service plan factor, NSPF, is calculated by the processing unit 2 if there has been a shift to new service class.

In a step S208 the age on the home network from the activation date of the subscriber is calculated by the processing unit 2.

In a step S210 the degree-ratio using the number of connections in the home network and the total number of connections is calculated by the processing unit 2.

In a step S212 the account balance-ratio is calculated by the processing unit 2 using the current account balance and mode of account balance when refill was done (balance after which churn score is reset 0).

In steps S214a, S214b and S214c the values read and/or calculated are by the processing unit 2 used to determine a value for f(x), $f(x)_{min}$ and $f(x)_{max}$, respectively.

In a steps S216 the normalized churn score is calculated by the processing unit 2 using f(x), $f(x)_{min}$ and $f(x)_{max}$.

According to one embodiment steps S202 to 3216 are executed on a day-to-day basis, and thus repeated in a step S218.

Subscribers may be associated with a network resource configuration. However, it may be beneficial to determining network resource configuration not for all subscribers but instead to a subgroup of subscribers. The determined churn score is therefore used to determine a subgroup of subscribers from the group of subscribers. Hence, in a step S6, a subgroup of subscribers is determined from the group of subscribers based on the churn score. According to an embodiment the subgroup of subscribers is determined by the processing unit 2 of the network operator node 1. The processing unit 2 is thus arranged to determine the subgroup.

Assume that there are 'm' subscribers in the subgroup. Determining the 'm' subscribers is according to embodiments achieved according to the following:

1. Order the subscribers in descending order of their churn score,
2. Select the top 'm' subscribers based on their churn score,
3. If selecting only the top 'm' subscribers based on distinct churn scores is not directly possible (as there might be two or more subscribers having the same churn score), the top churn score subscribers may be ordered based on the cumulative value of the refill amount over the period of the analysis (for example the last 'n' months). The subscribers with a higher cumulative refill amount may then be regarded as more highly ranked than other subscribers, and
4. Determine the subgroup from the subscribers found in step 2 or 3. The subgroup may thus be determined by subscribers having churn scores higher than a predetermined churn score value (as in step 2). Additionally or alternatively the subgroup may thus be determined by a fraction of the subscribers having a highest churn score (as in step 3). The determined subgroup comprises at least one subscriber.

Elimination of False Positives Based on Recent Churn Score Trend

Certain subscribers exhibit a trend of falling into the churn risk zone on a regular basis and then return back to normalcy. Such subscribers, though they have a high churn score, if considered as potential churners each time would contribute to false positives (in terms or churning). False positives may be eliminated by removing subscribers with churn score values within the range of the mode of the last 'n' churn scores for that subscriber (i.e. the churn score just before a refill event i.e. at the instant before the churn score becomes 0).

The operator may thereby limit the number of subscribers of which network resource configuration may be determined. The operator could, based on the churn score and for example on a budget allocation, thereby determine a network resource configuration in the communications system only for the subgroup of subscribers. Thus, in a step S8 a network resource configuration in the communications system is determined for the subgroup of subscribers based on the churn score. According to an embodiment the network resource configuration is determined by the processing unit 2 of the network operator node 1. The processing unit 2 is thus arranged to determine the network resource configuration. In a step S10 information relating to the determined network resource configuration and/or a service related to the determined network resource configuration is transmitted. According to an embodiment the network resource configuration is transmitted by the transmitter 6 of the network operator node 1. The transmitter 6 is thus arranged to transmit the network resource configuration. According to an embodiment the information is transmitted to at least one of the subgroup of subscribers, the network operator and a further entity arranged to receive the information. The further entity may be another network operator or any other entity operatively coupled to the network operator.

In a step S12 at least steps S2, S4, S6, S8 and S10 of the method for network resource configuration may be repeated by the network operator node 1 after a predetermined interval. The predetermined interval may be between 12 hours and 72 hours, more preferably between 12 hours and 48 hours, most preferably about 24 hours. In other words, the method for network resource configuration may be executed on a day-to-day basis, thereby preventing to potential churners in time.

Two typical scenarios herein provided as exemplary embodiments where the disclosed subject matter may readily apply will be disclosed next. However, as the skilled person understands, these are just a few examples of possible scenarios where the disclosed subject matter may readily apply.

Scenario 1: Network Resource Configuration

A first scenario relates to network resource configuration. According to this scenario the churn score is used to determine a network resource configuration for the subgroup of subscribers. More particularly, in a step S14 a network resource determined by the network resource configuration may be allocated to the subgroup of subscribers. According to an embodiment the network resource is allocated by the processing unit 2 of the network operator node 1. The processing unit 2 may thus be arranged to allocate the network resource. Thus, the network resource is allocated to a subgroup of subscribers as determined from the churn score. There may be different example of network resource allocation. For example, in a step S16 a current resource allocation for the subgroup of subscribers in the communications system may be modified. According to an embodiment the current resource allocation is modified by the processing unit 2 of the network operator node 1. The processing unit 2 may thus be arranged to modify the current resource allocation. The modification may relate to the current resource allocation being increased. Thereby the subgroup of subscribers as determined from the churn score may be provided with modified resource allocation. The current resource allocation may be modified such that a predetermined quality of service is obtained for the subgroup of subscribers. The network resource may for example represent bandwidth allocation. Hence subscribers determined by the churn score (and which subscribers hence are likely to churn) may be allocated an increased bandwidth. Having been allocated an increased bandwidth may prevent the subscribers from churning. Thereby the present disclosure may be used to identify potential churners and to allocate modified resources to the potential churners. Priority based network benefits like bandwidth allocation, QoS may thus be tuned for specific subscribers based on calculated churn score. Subscribers with high retention may be identified based on the churn score. When a subscriber in this subset of subscribers starts a data session, the QoS can be increased through a Gateway GPRS Support Node (GGSN) which enables the subscriber to have an increased network configuration, which in turn could prevent the subscriber from churning. Thus using churn score, configurations could be made in the core network.

Scenario 2: Network Subscription Service

A second scenario relates to a network subscription service or any related service. That is, according to this scenario the service is a network subscription service or a related service. The service may be a utility service. The service may be offered by a third party. According to this scenario the churn score is used to determine a network subscription service or any related service for the subgroup of subscribers. The service may be provided by the network operator and/or a third party. For example, the network subscription service may relate to modifying a current resource allocation for the subgroup of subscribers in the communications system. The information transmitted in step S10 may relate to a subscription offer. The churn score could thus be an integral part of a recommender system which could provide the network operator with actionable information to enable tailored service plan recommendation, targeted advertising (towards specific subscribers instead of spamming to the entire set of subscribers, thereby saving revenue and network resources), campaign launching and follow-up for a selected subgroup (or configuring specific rates), loyalty programs, retention prioritization etc.

The campaign may be network related or related to an operator partnership with one or more third party entities (even with non-telecommunications related third party entities). The campaign may enable offers to be provided to the determined subgroup of subscribers. For example, a campaign based on a co-operation between the network provider and a third party could be provided to the determined subgroup of subscribers. Therefore, information relating to network related activities of the subscribers may be communicated from the network operator to the third party, and vice versa. For example, information relating to network resources as consumed by the subscribers may be communicated from the network operator to the third party. Likewise, activities performed by the subscribers and related to a service provided by the third party may be communicated from the third party to the network operator. The activities of the third party may be associated with a point-earning bonus program. Thereby a network resource consumed by a subscriber may be related to a third party point-earning bonus program. The network resource may relate to the number of data bytes consumed by the subscriber. Thereby, once a subscriber consumes a number of data bytes the subscriber may earn a number of points in the point-earning bonus program. Similarly, once a subscriber earns a number of points in the point-earning bonus program this may result in that the subscriber is offered to consume a number of data bytes in the network without charge. The third party point-earning bonus program may be a frequent flyer point-earning bonus program, a credit card point-earning bonus program, a hotel point-earning bonus program, a retail point-earning bonus program, or the like.

Transmitting the information in step S10 may trigger a countdown timer to be started. Further information relating to the determined network resource configuration may be transmitted, in a step S18, to the subgroup of subscribers. According to an embodiment the further information is transmitted by the transmitter 6 of the network operator node 1. The transmitter 6 may thus be arranged to transmit the further information. The further information is transmitted when the countdown has been reach and when acceptance of the network subscription service has not been received from the subgroup of subscribers. That is, the further information may be transmitted only if feedback on the information transmitted in step S10 has not been received.

The invention has mainly been described above with reference to a few embodiments and scenarios. However, as is readily appreciated by a person skilled in the art, other embodiments and scenarios than the ones disclosed above are equally possible within the scope of the invention, as defined by the appended patent claims. For example, the disclosed model of churn prediction (and hence also the enclosed embodiments) could also be applied in other contexts than telecommunications applications. For example, the disclosed model of churn prediction could be equally applied in other applications, such as broadcast satellite television subscriptions, broadband Internet subscriptions, direct-to-home (DTH) service providers, relating to network related activities and subscriber related activities.

The invention claimed is:

1. A method for network resource configuration, comprising:
    receiving, by a receiver of a network operator node, subscriber data from a database operatively connected to the network operator node, the subscriber data relating to network related activities and subscriber related activities of subscribers in a group of subscribers of a network operator of a communications system;
    determining, by a processor of the network operator node, a churn score for each subscriber in the group of subscribers based on a set of churn score parameters for the subscriber data, the churn score representing a probability of a subscriber to churn, wherein at least one of the churn score parameters of one subscriber relates to a number of contacts associated with said one subscriber that are associated with the same network operator as said one subscriber;
    determining, by the processor of the network operator node, a subgroup of subscribers from the group of subscribers based on the churn score;
    determining, by the processor of the network operator node, the network resource configuration in the communications system for the subgroup of subscribers based on the churn score;
    transmitting, by a transmitter of the network operator node, information relating to one or more of the determined network resource configuration and a service related to the determined network resource configuration to a further entity arranged to receive the information;
    receiving, by the receiver of the network operator node, one or more of service plan recommendations, targeted advertisements, and loyalty programs for the subgroup of subscribers from the further entity based on the information received by the further entity; and
    transmitting, by the transmitter of the network operator node, the one or more of service plan recommendations, targeted advertisements, and loyalty programs to the subgroup of subscribers.

2. The method according to claim 1, wherein the information is further transmitted, by the transmitter of the network operator node, to at least one of the subgroup of subscribers and the network operator.

3. The method according to claim 1, further comprising:
    repeating all steps of the method after a predetermined interval.

4. The method according to claim 1, wherein at least one of the churn score parameters of said one subscriber relates to subscription refill statistics of said one subscriber.

5. The method according to claim 4, wherein the subscription refill statistics of said one subscriber relates to a time since the last subscription refill for said one subscriber, and wherein the churn score is proportional to said time since the last subscription refill for said one subscriber.

6. The method according to claim 5, wherein the subscription refill statistics of said one subscriber relates to a time since the first subscription refill for said one subscriber, and wherein the churn score is inversely proportional to a logarithm of said time since the first subscription refill for said one subscriber.

7. The method according to claim 4, wherein the subscription refill statistics of said one subscriber relates to a mean time between subscription refills, MTBSR, for said one subscriber, and wherein the churn score is proportional to the MTBSR.

8. The method according to claim 1, wherein at least one of the churn score parameters of said one subscriber relates to a current account balance of said one subscriber at a time of subscription refill, and wherein the churn score is proportional to said current account balance.

9. The method according to claim 1, wherein at least one of the churn score parameters of said one subscriber relates to a current service plan of said one subscriber.

10. The method according to claim 1, wherein the subgroup of subscribers is determined, by the processor of the network operator node, by subscribers having churn scores higher than a predetermined churn score value.

11. The method according to claim 1, wherein the subgroup of subscribers is determined, by the processor of the network operator node, by a fraction of the subscribers having a highest churn score.

12. The method according to claim 1, further comprising:
    allocating, by the processor of the network operator node, a network resource determined by the network resource configuration to the subgroup of subscribers.

13. The method according to claim 12, wherein allocating, by the processor of the network operator node, the network resource comprises:
    modifying, by the processor of the network operator node, a current resource allocation for the subgroup of subscribers in the communications system.

14. The method according to claim 13, wherein the current resource allocation is modified such that a predetermined quality of service is obtained for the subgroup of subscribers.

15. The method according to claim 12, wherein the network resource represents bandwidth allocation.

16. The method according to claim 1, wherein the service is a network subscription service.

17. The method according to claim 16, wherein the service is provided by the network operator.

18. The method according to claim 17, wherein the network subscription service relates to modifying, by the processor of the network operator node, a current resource allocation for the subgroup of subscribers in the communications system.

19. The method according to claim 17, wherein transmitting, by the transmitter of the network operator node, said information triggers a countdown timer to be started.

20. The method according to claim 19, further comprising, upon reaching the countdown and unless acceptance of the network subscription service has been received from the subgroup of subscribers:
transmitting, by the transmitter of the network operator node, further information relating to the determined network resource configuration to the subgroup of subscribers.

21. A network operator node for network resource configuration, comprising:
a receiver arranged to receive subscriber data from a database operatively connected to the network operator node, the subscriber data relating to network related activities and subscriber related activities of subscribers in a group of subscribers of a network operator of a communications system;
one or more processors arranged to determine a churn score for each subscriber in the group of subscribers based on a set of churn score parameters for the subscriber data, the churn score representing a probability of a subscriber to churn, wherein at least one of the churn score parameters of one subscriber relates to a number of contacts associated with said one subscriber that are associated with the same network operator as said one subscriber;
the one or more processors further being arranged to determine a subgroup of subscribers from the group of subscribers based on the churn score;
the one or more processors further being arranged to determine the network resource configuration in the communications system for the subgroup of subscribers based on the churn score;
a transmitter arranged to transmit information relating to one or more of the determined network resource configuration and a service related to the determined network resource configuration to a further entity arranged to receive the information;
the receiver further being arranged to receive one or more of service plan recommendations, targeted advertisements, and loyalty programs for the subgroup of subscribers from the further entity based on the information received by the further entity; and
the transmitter further being arranged to transmit the one or more of service plan recommendations, targeted advertisements, and loyalty programs to the subgroup of subscribers.

22. A non-transitory computer readable medium for network resource configuration, the non-transitory computer readable medium comprising one or more instructions which, when run on a network operator node, causes the network operator node to:
receive, by a receiver of the network operator node, subscriber data from a database operatively connected to the network operator node, the subscriber data relating to network related activities and subscriber related activities of subscribers in a group of subscribers of a network operator of a communications system;
determine, by a processor of the network operator node, a churn score for each subscriber in the group of subscribers based on a set of churn score parameters for the subscriber data, the churn score representing a probability of a subscriber to churn, wherein at least one of the churn score parameters of one subscriber relates to a number of contacts associated with said one subscriber that are associated with the same network operator as said one subscriber;
determine, by the processor of the network operator node, a subgroup of subscribers from the group of subscribers based on the churn score;
determine, by the processor of the network operator node, the network resource configuration in the communications system for the subgroup of subscribers based on the churn score;
transmit, by a transmitter of the network operator node, information relating to one or more of the determined network resource configuration and a service related to the determined network resource configuration to a further entity arranged to receive the information;
receive, by the receiver of the network operator node, one or more of service plan recommendations, targeted advertisements, and loyalty programs for the subgroup of subscribers from the further entity based on the information received by the further entity; and
transmit, by the transmitter of the network operator node, the one or more of service plan recommendations, targeted advertisements, and loyalty programs to the subgroup of subscribers.

23. The non-transitory computer readable medium according to claim 22, further comprising a non-volatile computer readable memory on which the one or more instructions are stored.

24. The method according to claim 1, wherein at least one of the churn score parameters relates to a duration of time said one subscriber has been associated with a network, the duration of time being based at least in part on an activation date of said one subscriber.

* * * * *